United States Patent
Lee et al.

(10) Patent No.: US 9,312,764 B2
(45) Date of Patent: Apr. 12, 2016

(54) APPARATUS AND METHOD FOR CONTROLLING BIDIRECTIONAL DC-DC CONVERTER

(71) Applicant: LSIS CO., LTD., Anyang-si, Gyeonggi-do (KR)

(72) Inventors: Se Hyung Lee, Anyang-si (KR); Bum Su Jun, Cheonan-si (KR); Ung Hoe Kim, Incheon (KR); Hyoung Taek Kim, Daejeon (KR); Young Min Kim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 19 days.

(21) Appl. No.: 14/061,519

(22) Filed: Oct. 23, 2013

(65) Prior Publication Data

US 2014/0117963 A1  May 1, 2014

(30) Foreign Application Priority Data

Oct. 30, 2012  (KR) .................. 10-2012-0121617

(51) Int. Cl.
*H02M 3/157* (2006.01)
*H02M 3/156* (2006.01)
(Continued)

(52) U.S. Cl.
CPC .............. *H02M 3/157* (2013.01); *H02M 3/156* (2013.01); *H02M 3/1582* (2013.01); *G05F 1/24* (2013.01)

(58) Field of Classification Search
CPC ... H02M 3/157; H02M 3/156; H02M 3/1582; H02M 3/155; H02M 3/335; H02M 1/08; H02M 3/158; H01L 31/044; H01L 31/05; G05F 1/24; G05F 1/62

USPC ..................... 363/98; 323/288, 283
See application file for complete search history.

(56) References Cited

U.S. PATENT DOCUMENTS 4,736,151 A    4/1988  Dishner
4,979,218 A *  12/1990 Strahm .................. H03H 11/32
                                                        330/258
5,576,638 A *  11/1996 Yada .................... H03F 3/45511
                                                          326/62

(Continued)

FOREIGN PATENT DOCUMENTS

CN    201422073    3/2010
CN    201639546    11/2010

(Continued)

OTHER PUBLICATIONS

Japan Patent Office Application Serial No. 2013-216312, Office Action dated Sep. 17, 2014, 2 pages.

(Continued)

*Primary Examiner* — Jessica Han
*Assistant Examiner* — Demetries A Gibson
(74) *Attorney, Agent, or Firm* — Lee Hong Degerman Kang & Waimey; Jonathan Kang; Jeffrey Lotspeich

(57) ABSTRACT

An apparatus and a method for controlling a direct-current (DC)-DC converter used in a vehicle are provided. The apparatus includes a switching control unit checking a difference between voltages of an input unit and an output unit and controlling an operation of at least one switch formed in a converter according to an operation mode of the converter according to the difference of voltages; and the converter controlling the operation of the at least one switch based on a control signal applied from the switching control unit to allow a current to flow from the input unit to the output unit.

4 Claims, 3 Drawing Sheets

(51) Int. Cl.
*H02M 3/158* (2006.01)
*G05F 1/24* (2006.01)

(56) References Cited

U.S. PATENT DOCUMENTS

| | | | | |
|---|---|---|---|---|
| 5,734,258 | A * | 3/1998 | Esser | H02M 3/1582 323/224 |
| 6,068,360 | A * | 5/2000 | Hiwada | B41J 2/04541 347/14 |
| 6,320,358 | B2 | 11/2001 | Miller | |
| 6,765,371 | B2 | 7/2004 | Kataoka | |
| 6,937,483 | B2 * | 8/2005 | Zhu | H02M 3/33576 363/17 |
| 2004/0027101 | A1 * | 2/2004 | Vinciarelli | H02M 3/1582 323/259 |
| 2007/0126506 | A1 * | 6/2007 | Lu | H03F 3/45 330/253 |
| 2007/0167285 | A1 * | 7/2007 | Long | F16H 61/20 477/182 |
| 2007/0201596 | A1 * | 8/2007 | Flowers | H03L 7/095 375/376 |
| 2007/0210782 | A1 * | 9/2007 | Prexl | H02M 3/1582 323/288 |
| 2008/0062733 | A1 * | 3/2008 | Gay | 363/98 |

FOREIGN PATENT DOCUMENTS

| | | |
|---|---|---|
| JP | 2004-350426 | 12/2004 |
| JP | 2008-228420 | 9/2008 |
| JP | 2011-004507 | 1/2011 |

OTHER PUBLICATIONS

Korean Intellectual Property Office Application Serial No. 10-2012-0121617, Office Action dated Oct. 10, 2013, 4 pages.

Yang, et al., "Design of a 49kW high efficiency bidirectional DC-DC converter for charge and discharge of high voltage battery in HEV", Seoul National University of Technology, Nov. 2007, 4 pages.

Korean Intellectual Property Office Application Serial No. 10-2012-0121617, Notice of Allowance dated Jan. 6, 2014, 3 pages.

Japan Patent Office Application Serial No. 2013-216312, Office Action dated Jun. 25, 2015, 2 pages.

The State Intellectual Property Office of the People's Republic of China Application Serial No. 201310527060.4 Office Action dated Aug. 20, 2015, 7 pages.

* cited by examiner (a)

(b)

APPARATUS AND METHOD FOR CONTROLLING BIDIRECTIONAL DC-DC CONVERTER

CROSS-REFERENCE TO RELATED APPLICATIONS

Pursuant to 35 U.S.C. §119(a), this application claims the benefit of earlier date and right of priority to Korean Patent Application No. 10-2012-0121617, filed on Oct. 30, 2012, the contents of which is incorporated by reference herein in its entirety.

BACKGROUND

The present disclosure relates to an apparatus and a method for controlling a direct-current (DC)-DC converter used in a vehicle.

Due to rapid increase of oil tax, automobiles increasing fuel efficiency have been released, for example, automobiles with idle stop & go (hereinafter, referred to as ISG) systems built therein.

ISG systems are not general starter motors of vehicles but integrated motors of starters and alternators, which operate as alternators while engines are operating. ISG systems, as described above, may be divided into an integrated type in which an alternator and a starter are formed as a single body and a separable type in which an alternator and a starter are separated from each other. However, configurations and operations thereof are similar. Accordingly, since ISG systems may be easily applied to engine automobiles, a demand thereof has increased.

FIGS. 1A and 1B are configuration views illustrating general starters of vehicles including an ISG system, respectively.

In FIG. 1A, the starter includes an input unit and output unit 11 and 15, in which flows of current occur, and a plurality of switches 12 and 14 and an inductor 13 for conduction of the input unit and output unit 11 and 15.

When a current flow occurs from the input unit 11 to the output unit, the input unit 11 may perform an input ripple removal function. Also, a plurality of switches 12a and 12b of a first switch unit part 12 may be driven as switches for a buck mode operation, and a plurality of switches 14a and 14b of a second switch part 14 and the inductor 13 may perform a switch function for a boost mode operation.

On the contrary, when a current flow occurs from the output unit 15 to the input unit 11, the plurality of switches 14a and 14b of the second switch part 14 may be driven as switches for the buck mode operation. In the case, the plurality of switches 12a and 12b of the first switch part and the inductor 13 may perform the switch function for the boost mode operation.

Also, in the case of FIG. 1B, similar to FIG. 1A, when a current flow occurs from an input unit 21 to an output unit 25, a plurality of switches 22a to 22f of a first switch part 22 perform a switch function for a buck mode operation. Also, a plurality of switches 23a to 23f of a second switch part 23 may perform a switch function for a boost mode operation.

On the contrary, when a current flow occurs from the output unit 25 to the input unit 21, the plurality of switches 23a to 23f of the second switch part 23 may be driven as switches for the buck mode operation. Also, a plurality of inductors 24a to 24c of the inductor 24 and the plurality of switches 22a to 22f of the first switch part 22 may perform the switch function for the boost mode operation.

The starter of the vehicle including the ISG system as described above may have a limitation such as heat generation caused by a configuration of the pluralities of switches and inductors and high conduction losses. In the case of such converter, a converter having high capacitance is not provided and a serial structure may be used in such a way that structural complexity of a control apparatus may occur.

SUMMARY

Embodiments provide an apparatus and a method for controlling a direct-current (DC)-DC converter to simplify a structural arrangement and to reduce heating phenomenon caused by capacity, with respect to a converter formed in an idle stop & go (ISG) system.

In one embodiment, a converter controlling apparatus includes a switching control unit checking a difference between voltages of an input unit and an output unit and controlling an operation of at least one switch formed in a converter according to an operation mode of the converter according to the difference of voltages; and the converter controlling the operation of the at least one switch based on a control signal applied from the switching control unit to allow a current to flow from the input unit to the output unit.

In another embodiment, a method for controlling a converter includes checking a difference between voltages of an input unit and an output unit and determining an operation mode of the converter according to the difference between voltages.

DETAILED DESCRIPTION OF THE EMBODIMENTS

Figure 1:
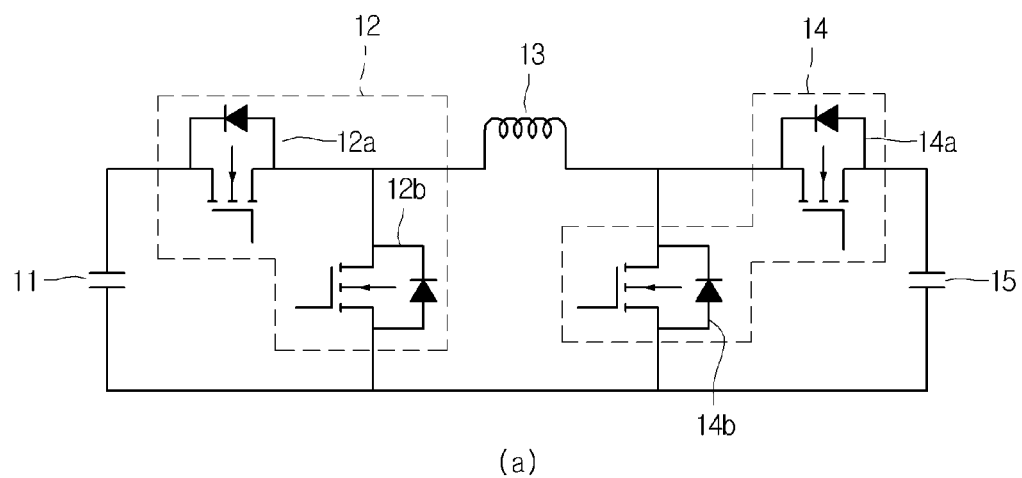
FIGS. 1A and 1B are configuration views illustrating general starters of vehicles including an ISG system, respectively.
Figure 1:
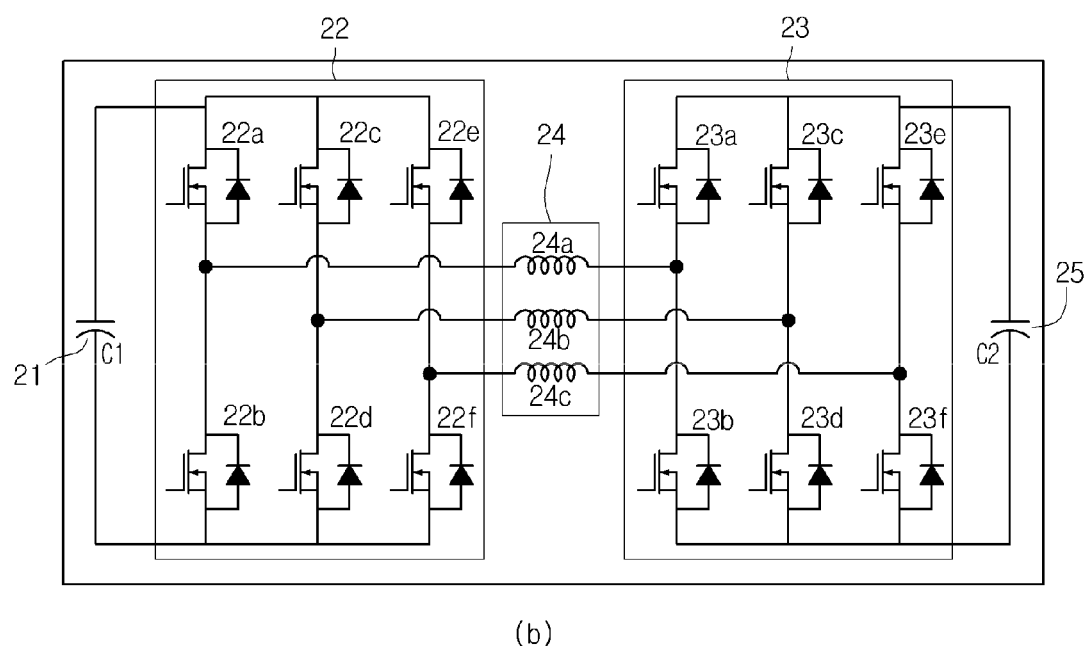

Terms and words used in the present disclosure and claims will not be understood being limited to general or lexical meanings. In an aspect that the inventor may properly define the concept of the terms in order to describe embodiments in the best way, the terms will be understood as meanings and concepts appropriate to the technical thoughts of the embodiments.

Accordingly, the embodiments disclosed in the specification and configurations illustrated in the drawings are just most exemplary embodiments, which do not represent the whole technical thoughts of the present embodiments. It should be understood various equivalents replaceable therefore and modified examples thereof may exists at the point in time of the present application.

Hereinafter, the embodiments will be described in detail with reference to the drawings.

Figure 2:
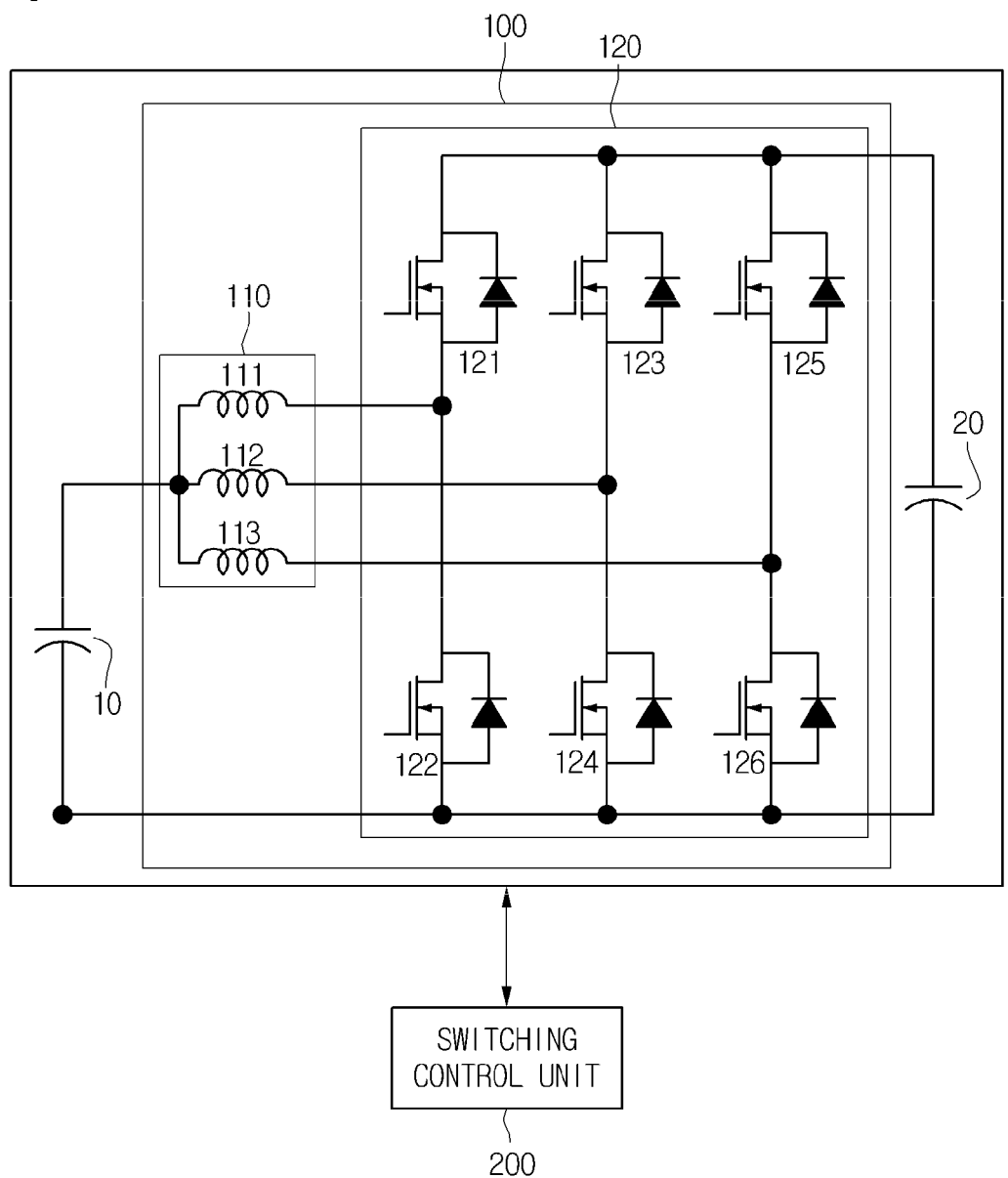
FIG. 2 is a block configuration view illustrating a starter of a vehicle including an ISG system according an embodiment.

FIG. 2 is a block configuration view illustrating a starter of a vehicle including an ISG system according an embodiment.

The starter may include an input unit 10, a direct-current (DC)-DC converter 100, an output unit 20, and a switching control unit 200.

For example, the input unit 10 may be an energy storage device for storing and outputting energy, such as an ultra capacitor UC, a lithium battery, and a lead (Pb) & absorbed glass mat (AGM) battery.

The input unit 10 and the output unit 20 may be movable according to a direction of a current flow.

The DC-DC converter 100 may include an inductor part 110 including one or more inductors 111, 112, and 113 and a switch part 120 including one or more switches 121, 122, 123, 124, 125, and 126.

The switches 121, 122, 123, 124, 125, and 126 of the switch part 120 may be configured as a shape in which one arm is connected in parallel and the number of the arms connected in parallel is not limited. In the present embodiment, a structure in which three arms including two switches are connected in parallel will be described.

The switch may be an insulated gat bipolar transistor (IGBT) or a metal-oxide semiconductor field-effect-transistor (MOSFET). Power supplied through the inductor 110 that is a three phase inductor may be connected to central points of the switches 121 and 122, 123 and 124, and 125 and 126 forming one arm, respectively.

Also, one or more arms 121 and 122, 123 and 124, and 125 and 126 of the switch part 120, formed of two switches, respectively, may be connected in parallel.

The converter 100 may measure input and output voltages of the input unit 10 and the output unit 20 and may operate in one of a buck mode, a bypass mode, and a boost mode according to an input and output voltage value. According to a control signal of the switching control unit 200, the respective switches 121, 122, 123, 124, 125, and 126 operate as switching devices when a switching control signal is inputted, that is, turned on and operate as diodes when a switching signal is turned off.

The inductor part 110 including the one or more inductors 111, 112, and 113 and the switch part 120 including the one or more switches 121, 122, 123, 124, 125, 126 perform switching operations to allow the converter 100 to operate as a certain mode according to a difference between voltages of the input unit 10 and the output unit 20, thereby increasing or decreasing an input voltage.

The switch control unit 200 may check the difference between voltages of the input unit 10 and the output unit 20 and may control respective switching signals of the switch part 120. The switching signal may determine an operation mode of the converter 100 according to the difference between voltages of the input unit 10 and the output unit 20.

Figure 3:
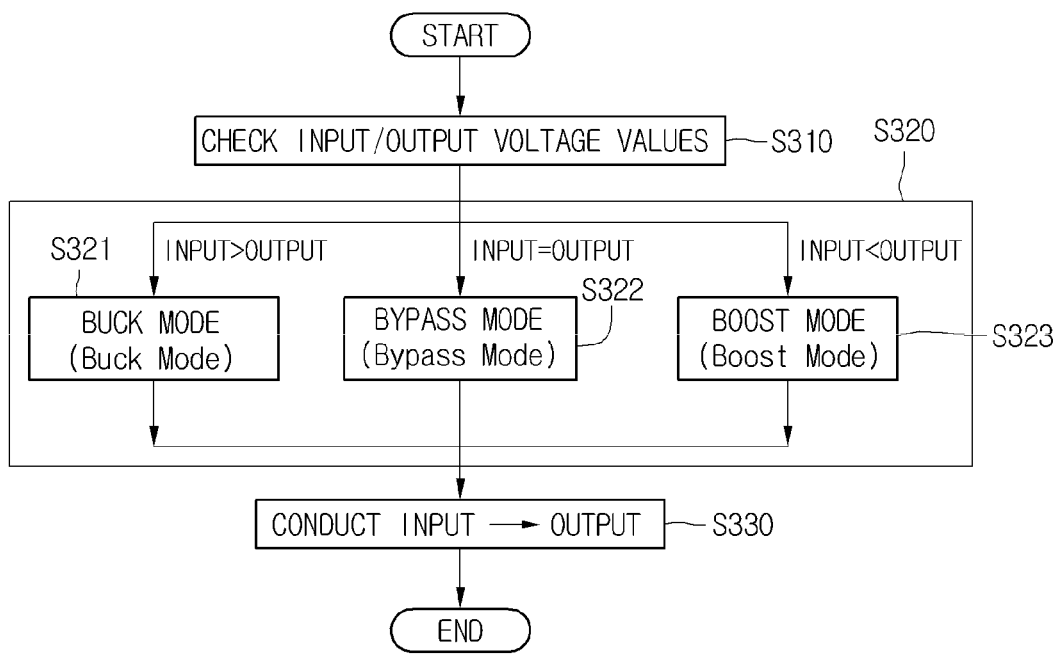
FIG. 3 is a flowchart illustrating an operation mode of the starter according to an input output voltage state according to an embodiment.

Referring to FIGS. 2 and 3, the operation of the converter 100 according to the difference between input and output voltages will be described in detail.

FIG. 3 is a flowchart illustrating an operation mode of the starter according to an input output voltage state according to an embodiment.

Referring to FIGS. 2 and 3, the switching control unit 200 checks voltage values of the input unit 10 and the output unit 20 (S310).

The switch control unit 200 may determine an operation mode S230 of the converter 100 according to a difference between voltages of the input unit 10 and the output unit 20. The operation mode S230 of the converter 100 may be one of a buck mode S231, a bypass mode S322, and a boost mode S323.

The switching control unit 200 checks voltage values of the input unit 10 and the output unit 20.

The switching control unit 200, when the voltage value of the input unit 10 is greater than the voltage value of the output unit 20, that is, when the difference between voltages is +, turns off the respective switches 121, 122, 123, 124, 125, and 126 forming the switch part 120 to perform a drop of an input voltage value by using inner diodes.

The inner diodes of the switches 121, 122, 123, 124, 125, and 126, when the switches 121, 122, 123, 124, 125, and 126 are turned off, may drop a voltage about 1.3 V. Considering inner resistances and conduction losses of the inductor part 110, about 1.5 V may be dropped with respect to the input voltage value.

Accordingly, when the difference between voltages of the input unit 10 and the output unit 20 is +, in order to perform a drop of voltage with respect to the input voltage value in the converter 100, the switching control unit 200 turns off the switches 121, 122, 123, 124, 125, and 126 of the switch part 120 and performs the buck mode in which a current is conducted through inner diodes in a first switch 121, a third switch 123, and a fifth switch 125 (S321).

Accordingly, the voltage value of the input unit 10 may be outputted to the output unit 20 while being dropped by about 1.5 V according to a voltage drop mode of the converter 100.

Alternatively, as a result of checking the voltage values of the input unit 10 and the output unit 20 by the switching control unit 200, when the voltage values of the input unit 10 and the output unit 20 are identical, that is, when the difference between voltages of the input unit 10 and the output unit 20 is '0', to output the input voltage value toward the output unit 20, the converter 100 performs a bypass mode S322.

The switching control unit 200, in the bypass mode, turns on the first switch 121, the third switch 123, and the fifth switch 125 among a plurality of switches forming the switch part 120 and turns off a second switch 122, a fourth switch 124, and a sixth switch 126.

Accordingly, the converter 100 operates in the bypass mode of outputting input power to the output unit 20 as it is (S330).

As described above, according to the difference between voltages of the input unit 10 and the output unit 20, the converter 100 may operate one of the buck mode, the bypass mode, and the boots mode, thereby maintaining the difference between voltages of the input unit 10 and the output unit 20 as '0'.

On the contrary, the first switch 121, the second switch 122, the third switch 123, the fourth switch 124, the fifth switch 125, and the sixth switch 126 of the switches of the switch part 120, in which a current flow occurs from the output unit 20 to the input unit 10 may be turned off to operate in the buck mode that is a voltage drop mode. In this case, the inductors 111, 112, and 113 of the inductor part 110 performs an operation for reducing ripples as an output LC filter together with the input unit 10.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A converter control apparatus comprising:
a converter comprising a first group of switches and a second group of switches that are located between an input unit and an output unit, wherein the switches of the first group are in parallel and the switches of the second group are in parallel, and wherein each switch of the first group of switches is in series with a corresponding switch of the second group of switches;

an inductor part connected to the input unit and located between the first group of switches and the second group of switches;

a switching control unit configured to:
  check a voltage difference between voltage of the input unit and voltage of the output unit;
  cause all switches of the first group of switches and all switches of the second group of switches to turn off according to a buck mode when the voltage difference is positive (+);
  cause all switches of the first group of switches to turn on, and cause all switches of the second group of switches to turn off, according to a bypass mode when the voltage difference is zero; and
  cause all switches of the first group of switches and all switches of the second group of switches to function according to a boost mode when the voltage difference is negative (−).

2. The converter controlling apparatus of claim 1, wherein the the bypass mode allows the input voltage to be identical to the output voltage.

3. The converter controlling apparatus of claim 1, wherein the input unit comprises one of an ultra capacitor, a lithium battery, or a Pb & absorbed glass mat (AGM) battery.

4. A method of controlling a converter, the method comprising:

checking a voltage difference between voltage of an input unit and voltage of an output unit;

causing all switches of a first group of switches and all switches of a second group of switches to turn off according to a buck mode when the voltage difference is positive (+), wherein the first group of switches and the second group of switches are located between the input unit and the output unit, wherein the switches of the first group are in parallel and the switches of the second group are in parallel, and wherein each switch of the first group of switches is in series with a corresponding switch of the second group of switches;

causing all switches of the first group of switches to turn on, and causing all switches of the second group of switches to turn off, according to a bypass mode when the voltage difference is zero; and causing all switches of the first group of switches and all switches of the second group of switches to function according to a boost mode when the voltage difference is negative (−).

* * * * *